(12) United States Patent
Hoffmann

(10) Patent No.: US 12,464,331 B2
(45) Date of Patent: Nov. 4, 2025

(54) WIRELESS DEVICE DETECTION SYSTEMS AND METHODS INCORPORATING STREAMING SURVIVAL MODELING FOR DISCRETE ROTATING IDENTIFIER DATA

(71) Applicant: Ubiety Technologies, Inc., Chicago, IL (US)

(72) Inventor: Mark Hoffmann, Lansing, IL (US)

(73) Assignee: Ubiety Technologies, Inc., Chicago, IL (US)

( * ) Notice: Subject to any disclaimer, the term of this patent is extended or adjusted under 35 U.S.C. 154(b) by 0 days.

(21) Appl. No.: 18/393,651

(22) Filed: Dec. 21, 2023

(65) Prior Publication Data

US 2024/0196185 A1   Jun. 13, 2024

Related U.S. Application Data

(63) Continuation of application No. 17/975,443, filed on Oct. 27, 2022, now Pat. No. 11,856,646, which is a continuation of application No. 17/072,948, filed on Oct. 16, 2020, now Pat. No. 11,490,241.

(51) Int. Cl.
  *H04W 8/00* (2009.01)
  *G06N 7/01* (2023.01)
  *H04W 12/75* (2021.01)

(52) U.S. Cl.
  CPC .............. *H04W 8/005* (2013.01); *G06N 7/01* (2023.01); *H04W 12/75* (2021.01)

(58) Field of Classification Search
  CPC ....... H04W 12/75; H04W 8/005; G06N 7/005
  See application file for complete search history.

(56) References Cited

U.S. PATENT DOCUMENTS

| | | |
|---|---|---|
| 10,109,166 B1 | 10/2018 | Selinger et al. |
| 10,304,303 B2 | 5/2019 | Selinger et al. |
| 10,856,136 B1 | 12/2020 | Espy et al. |
| 11,490,241 B2 | 11/2022 | Hoffmann |
| 2018/0040217 A1* | 2/2018 | Feldman ................. H04W 4/02 |
| 2020/0135008 A1 | 4/2020 | Horgan et al. |
| 2022/0124474 A1 | 4/2022 | Hoffmann |
| 2022/0237996 A1* | 7/2022 | Hodge ............. G08B 13/19645 |
| 2023/0156450 A1 | 5/2023 | Hoffmann |

* cited by examiner

*Primary Examiner* — Elton Williams
(74) *Attorney, Agent, or Firm* — Perkins Coie LLP

(57) ABSTRACT

A wireless device detection system includes sensors to receive temporary identifiers transmitted between a base station and a mobile wireless device. A cumulative distribution function for survival probability is generated based on delta times between multiple access events for each temporary identifier. In response to a new access event, a corresponding temporary identifier is added to a streaming list and assigned a survival probability value, based on the cumulative distribution function, to a latest access event for each temporary identifier contained in the streaming list. Temporary identifiers that have a survival probability value less than a threshold value are removed from the streaming list. The number of temporary identifiers contained in the streaming list are compared to a number of devices known to be present. The probability that a device corresponding to each of the temporary identifiers contained in the streaming list is present is determined.

20 Claims, 14 Drawing Sheets

- Sim 1
  - $P(Survival|delta_i)_{thresh} =$ 0.95
  - $Power_{thresh} = -80$
- Sim 2
  - $P(Survival|delta_i)_{thresh} =$ 0.85
  - $Power_{thresh} = -80$
- Sim 3
  - $P(Survival|delta_i)_{thresh} =$ 0.75
  - $Power_{thresh} = -80$

...

- Sim n
  - $P(Survival|delta_i)_{thresh} =$ 0.95
  - $Power_{thresh} = -80$

WIRELESS DEVICE DETECTION SYSTEMS AND METHODS INCORPORATING STREAMING SURVIVAL MODELING FOR DISCRETE ROTATING IDENTIFIER DATA

CROSS-REFERENCE TO RELATED APPLICATION

This application is a continuation of U.S. patent application Ser. No. 17/975,443, filed on Oct. 27, 2022, entitled "WIRELESS DEVICE DETECTION SYSTEMS AND METHODS INCORPORATING STREAMING SURVIVAL MODELING FOR DISCRETE ROTATING IDENTIFIER DATA," which is a continuation of U.S. patent application Ser. No. 17/072,948, filed on Oct. 16, 2020, entitled "WIRELESS DEVICE DETECTION SYSTEMS AND METHODS INCORPORATING STREAMING SURVIVAL MODELING FOR DISCRETE ROTATING IDENTIFIER DATA," both of which are incorporated herein by reference in their entireties.

TECHNICAL FIELD

This patent application is directed to wireless device detection through the collection and processing of wireless transmissions and digital signaling data, and more specifically, to processing temporary identifiers used in wireless protocols.

BACKGROUND

For security reasons, many hardware devices such as mobile phones, smart watches, headphones, computers, etc. attempt to obfuscate the identity of these devices by means of MAC address randomization on both Wi-Fi and Bluetooth protocols in addition to introducing temporary identifiers such as a TMSI within the cellular protocol.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
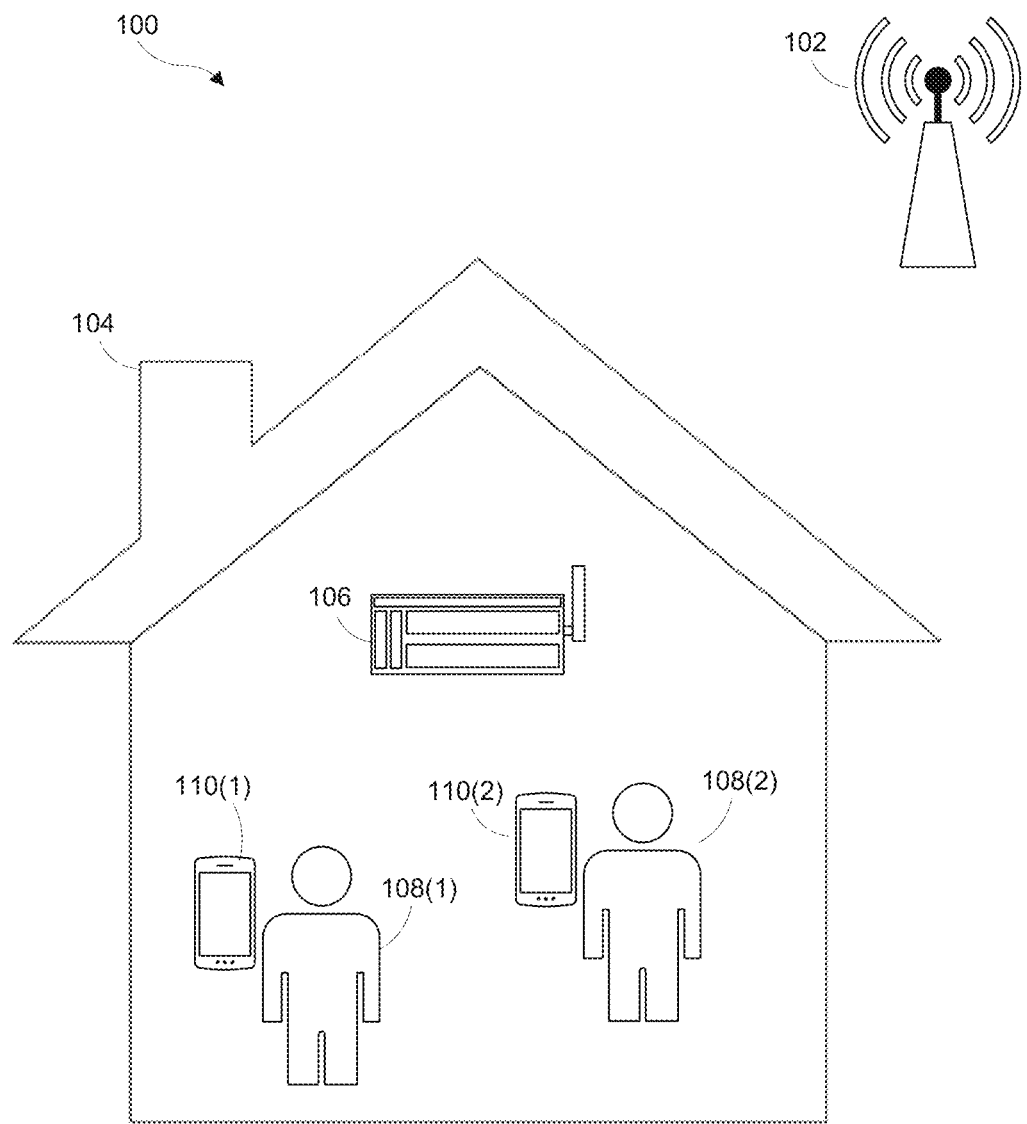
FIG. 1 illustrates a wireless device detection and data analytics powered security monitoring system according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed are methods and systems for collecting and processing wireless transmissions and digital signaling data, such as temporary identifiers used in wireless protocols. The disclosed technology includes survival modeling of temporary identifiers to help identify wireless devices. This technology can be used, for example, in data analytics powered security monitoring systems for identifying and tracking one or more people within an area, such as in and around a private residence or commercial business.

The disclosed technology provides a novel capability for extracting the likelihood that particular identifiers are still present from data containing rotating identifiers. This capability can adapt to the environment in which it was deployed and has a low memory/computational footprint being designed to run on the edge (i.e., in the sensors). The disclosed technology is built around the idea of building up sensor location-specific distributions and cellular activity, however, could be adapted to any suitable streaming data source where there is a problem of short-lived temporary identifiers. The methodology presented is also extensible to accept various forms of priors to augment the fidelity of behavior in addition to the ability to calibrate to a steady state ground truth.

FIG. 1 illustrates a security monitoring system 100. In this example, a sensor 106 is installed in a home 104 and detects wireless interfaces contained within wireless devices 110(1) and 110(2), each of which is associated with a corresponding user 108(1) and 108(2). Representative security monitoring systems are further described in co-pending U.S. patent application Ser. No. 16/801,915, filed Feb. 26, 2020, and entitled ELECTRONIC DEVICE IDENTIFICATION SYSTEM, APPARATUSES, AND METHODS, the disclosure of which is hereby incorporated by reference in its entirety.

Many hardware devices such as mobile phones, smart watches, headphones, computers, etc. attempt to obfuscate the identity of these devices by means of MAC address randomization on both Wi-Fi and Bluetooth protocols in addition to introducing temporary identifiers such as a TMSI within the cellular protocol. Accordingly, unless the devices 110(1) and 110(2) are attached to the home's network, it may be difficult to determine whether a particular device is a known device and/or whether the user associated with that device is welcome or not. Although various aspects of the technology are described with respect to cellular communications (e.g., TMSI) the disclosed systems and methods can be used with various types of passive signaling that includes Wi-Fi and Bluetooth, for example.

The sensor 106 can be configured to passively receive transmissions from both cell towers 102 and the cellular enabled electronic devices 110(1) and 110(2), to collect and process signaling data including temporary identifiers. In an embodiment according to the disclosed technology, the sensor 106 can be configured to process the collected temporary identifiers over time to create a survival model that can be used to provide a probability that an unknown device corresponds to the presence of an unwelcome entity (e.g., intruder).

Figure 2:
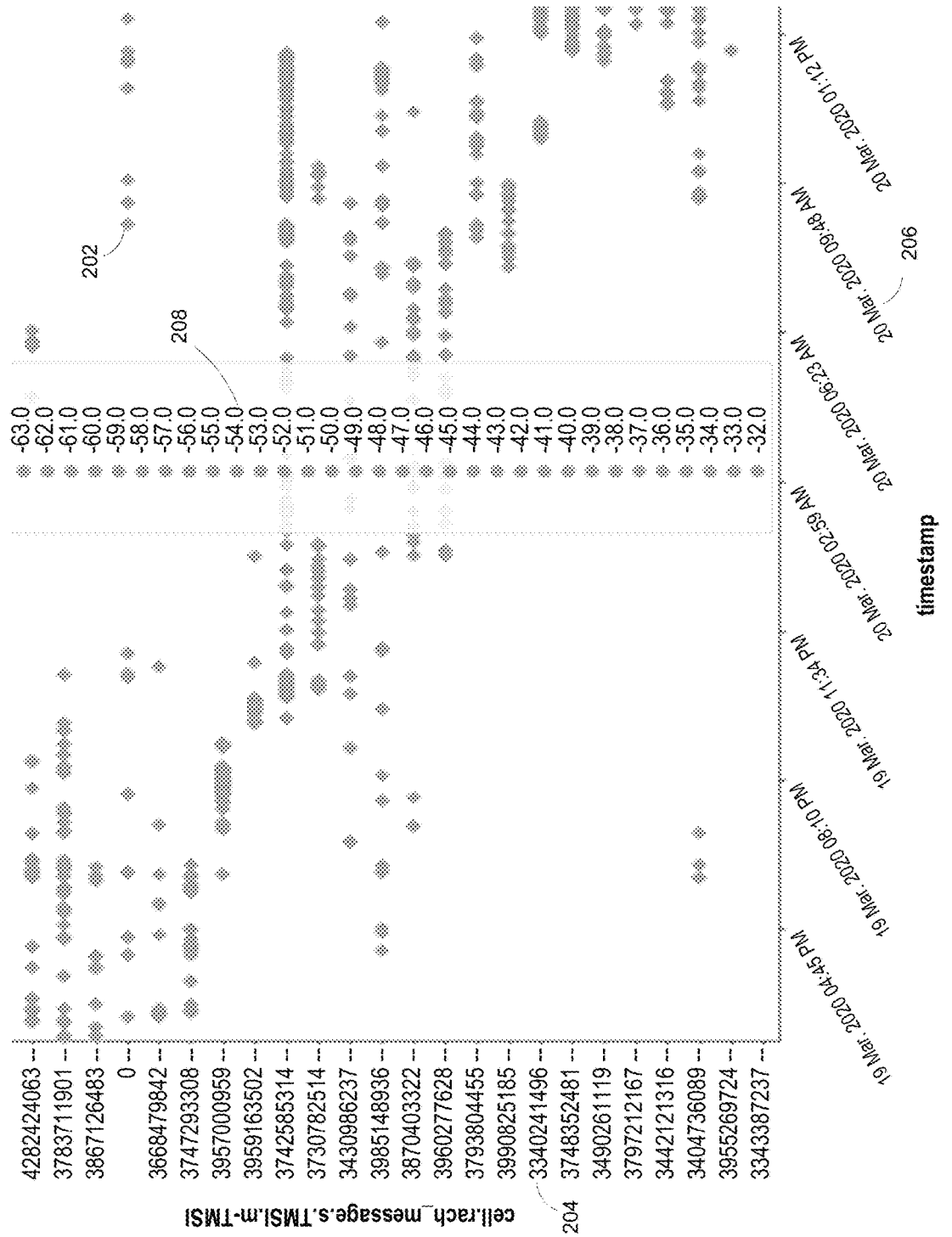
FIG. 2 is a chart illustrating temporary identifiers (TMSIs) plotted against time with a color overlay representing the power estimate measurement from a cellular device to a sensor.

An example of rotating TMSI data can be seen in FIG. 2. Each point 202 on this plot represents a cellular RACH (Random access channel) event. The y axis shows the various TMSI temporary identifiers 204 and is plotted against time 206 with a color overlay representing the power estimate measurement 208 from the cellular device to the sensor. The disclosed technology provides tools to determine whether one of these temporary identifiers belongs to an already seen device, a new device, or whether it is simply the same device that is emitting a rotated identifier.

In 4G LTE, cellular RACH messages follow a rotation pattern for the exposed unique identifier. The flow typically follows the network provider communicating the IMSI (a global and long term persistent identifier) along with the TMSI (short-lived identifier that is mapped in a many to one fashion to an IMSI). Then for all subsequent communication, the TMSI is the only identifier communicated. The TMSI has been seen to last for anywhere between 2-7 days and can be triggered to force rotate sometimes when doing actions such as toggling airplane mode. The time between RACH events from the same device depends on various factors such as behavior of the user that has the phone in addition to various configuration settings on the cellular tower.

Figure 3:
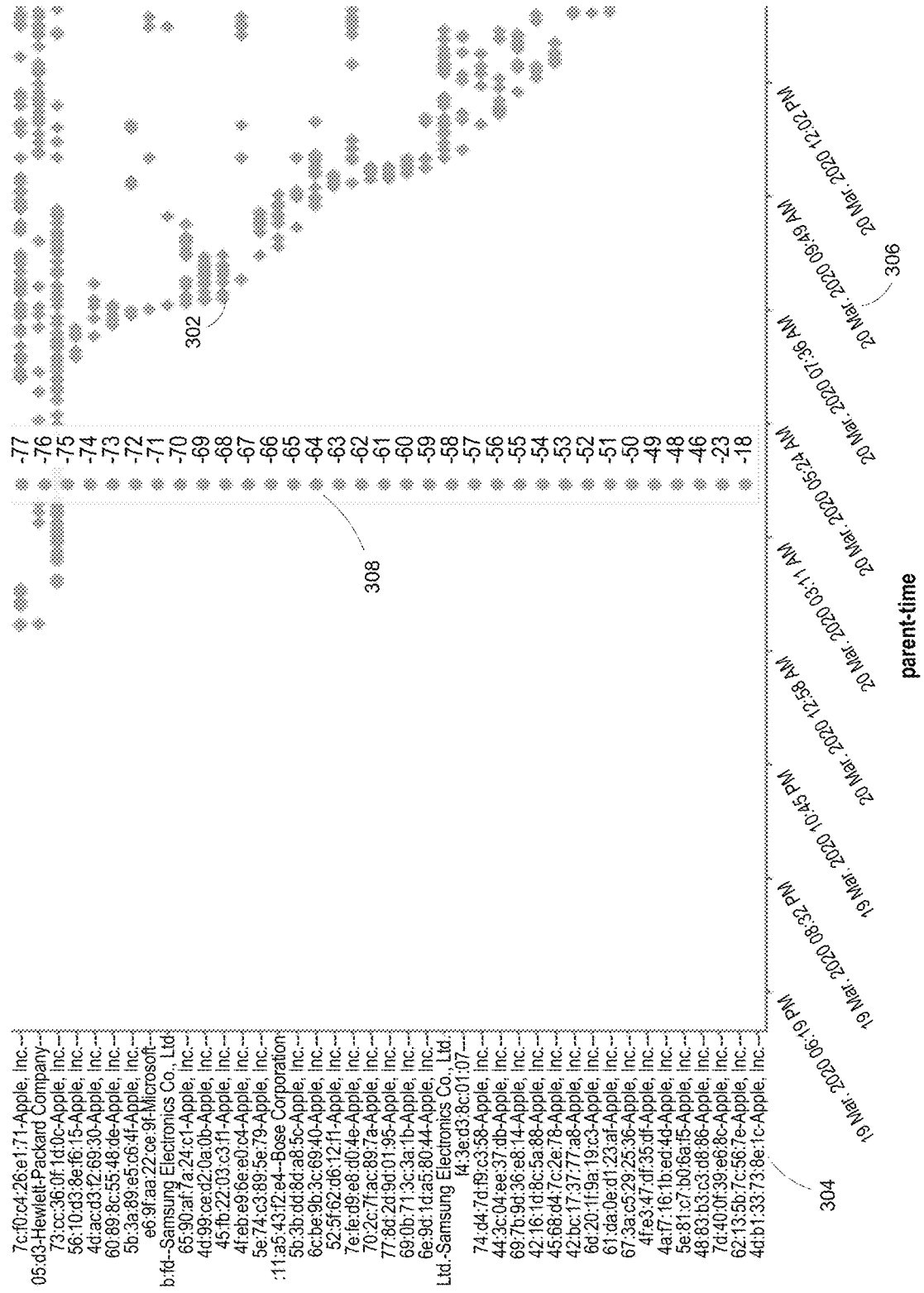
FIG. 3 is a chart illustrating temporary identifiers (Bluetooth MAC addresses) plotted against time with a color overlay representing power values.

FIG. 3 provides an example of rotating Bluetooth identifiers. Each point 302 on this plot represents a distinct point in time that a Bluetooth advertising packet from a device was detected passively. The y axis is a combination of the Bluetooth MAC address and the manufacturer 304 with these events plotted against time 306 and the color overlay representing power values 308.

Bluetooth devices vary greatly based on their unique identification rotation patterns. The implementation of randomization strategies for Bluetooth is largely manufacturer-dependent and can also be affected by operating system level logic. There is a subset of devices that reliably emit the same Bluetooth MAC address in addition to another subset that suggest very strong randomization patterns. Wi-Fi probe messages can be passively collected, which divulge information regarding the MAC address as well as occasionally SSIDs that that device has connected to in the past. Very similar to Bluetooth data, Wi-Fi probe message data contains different groups of devices, spanning the breadth of very chatty, to sparse as well as very rotational vs. consistent.

Figure 4:
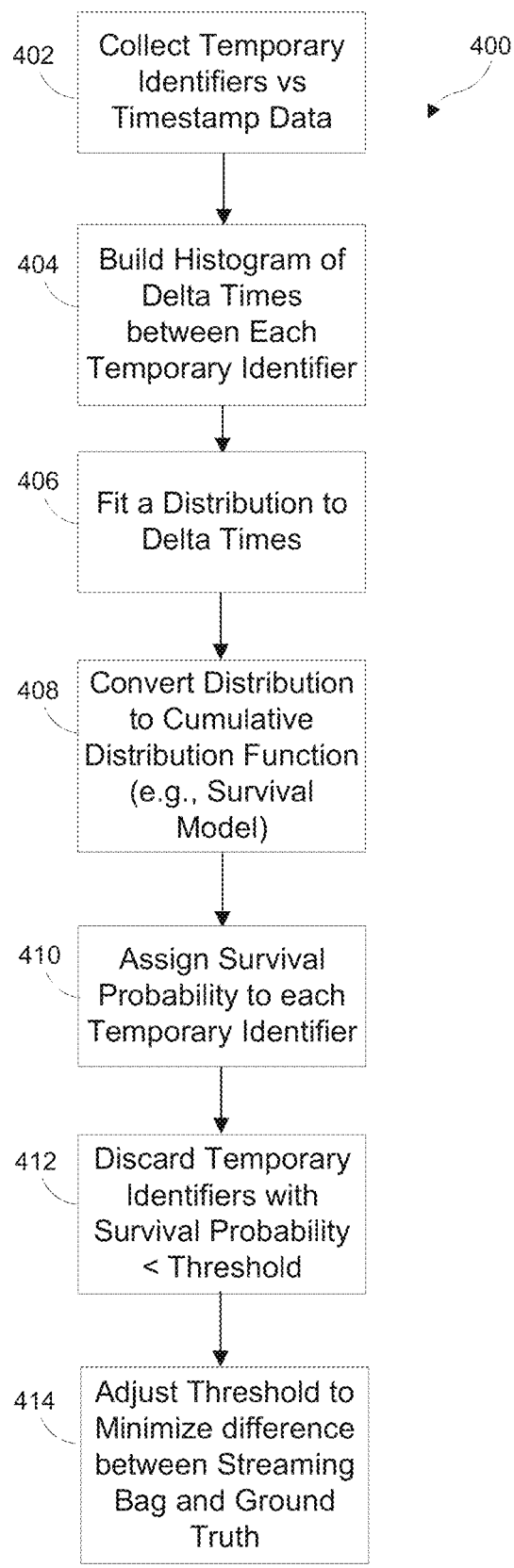
FIG. 4 is a flow diagram showing a method of assigning survival probability to temporary identifiers according to some embodiments of the present technology.

FIG. 4 is a flow diagram showing a method 400 of assigning survival probability to temporary identifiers according to some embodiments of the present technology. At step 402 temporary identifiers are collected (e.g., using a sensor 106) along with corresponding time stamp data for each of a plurality of access events, such as Random Access Channel (RACH) events. At step 404, a histogram is constructed from delta times between the plurality of access events for each of the temporary identifiers. At step 406, a probability distribution function is fit to the histogram. In some embodiments, the probability distribution function is fit to the histogram using an exponential kernel density estimate:

$$f(x) = K(x; h) \, \alpha \, \exp\left(-\frac{x}{h}\right)$$

PDF for kernel density estimate with Exponential kernel
Where h is the kernel bandwidth.

At step 408, the probability distribution function is converted to a cumulative distribution function for survival probability by integrating against the output of the kernel density estimate:

$$F(x) = \int_{-inf}^{x} \lfloor x(t) dt \quad \text{Conversion of the PDF to CDF}$$

At step 410 a survival probability value, based on the cumulative distribution function, is assigned to a latest access event for each temporary identifier. The delta time between the latest access event and the previous one is entered in the cumulative distribution function and then a survival function:

$$S(x) = 1 - F(x) \quad \text{Survival function our CDF}$$

Accordingly, the shorter the delta time between events for a particular temporary identifier, the higher the survival probability. The latest survival probability for each temporary identifier is maintained in a streaming list, also referred to herein as a streaming bag.

At step 412, temporary identifiers are removed from the streaming list that have a survival probability value less than a threshold value. At step 414, the threshold value can be adjusted to minimize the difference between the number of temporary identifiers contained in the streaming list and a number of confirmed devices known to be present at a location of interest.

Figure 5:
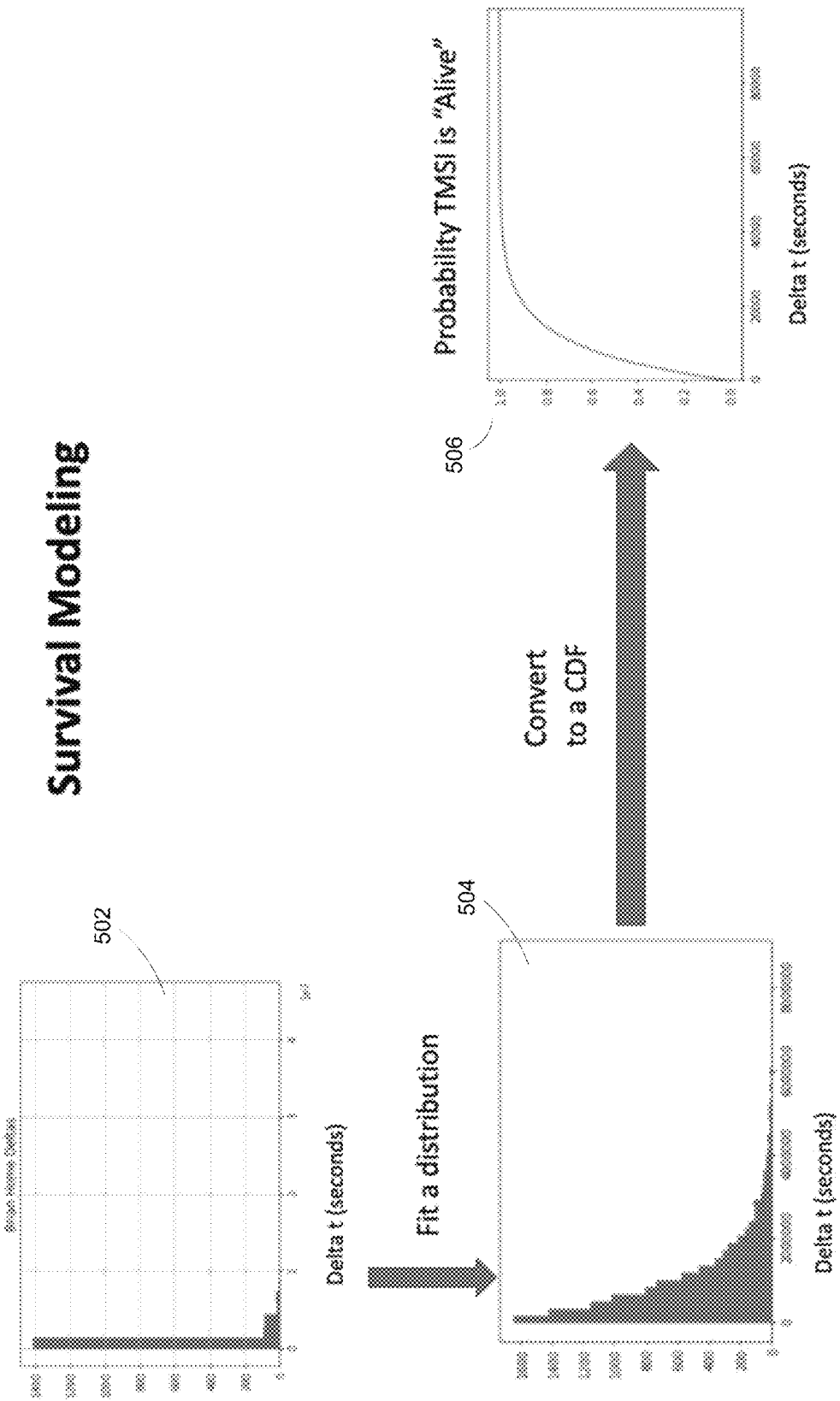
FIG. 5 is a graphic illustrating steps for building a cumulative distribution function for survival probability according to some embodiments of the present technology.

FIG. 5 is a graphic illustrating the steps for building a cumulative distribution function for survival probability according to method 400 described above. A histogram 502 is constructed from delta times between the plurality of access events for each of the temporary identifiers. Next, a probability distribution function 504 is fit to the histogram 502. The probability distribution function 504 is then converted to a cumulative distribution function for survival probability 506. The disclosed survival model can advantageously take into account various priors when fitting the distribution. The priors that can be used to influence the distribution for cellular devices can include carrier, time of day, and geography, for example. Examples of priors for devices emitting Bluetooth/Wi-Fi include manufacturer, time of day, and various pieces of metadata as part of the specific packet payload.

Figure 6:
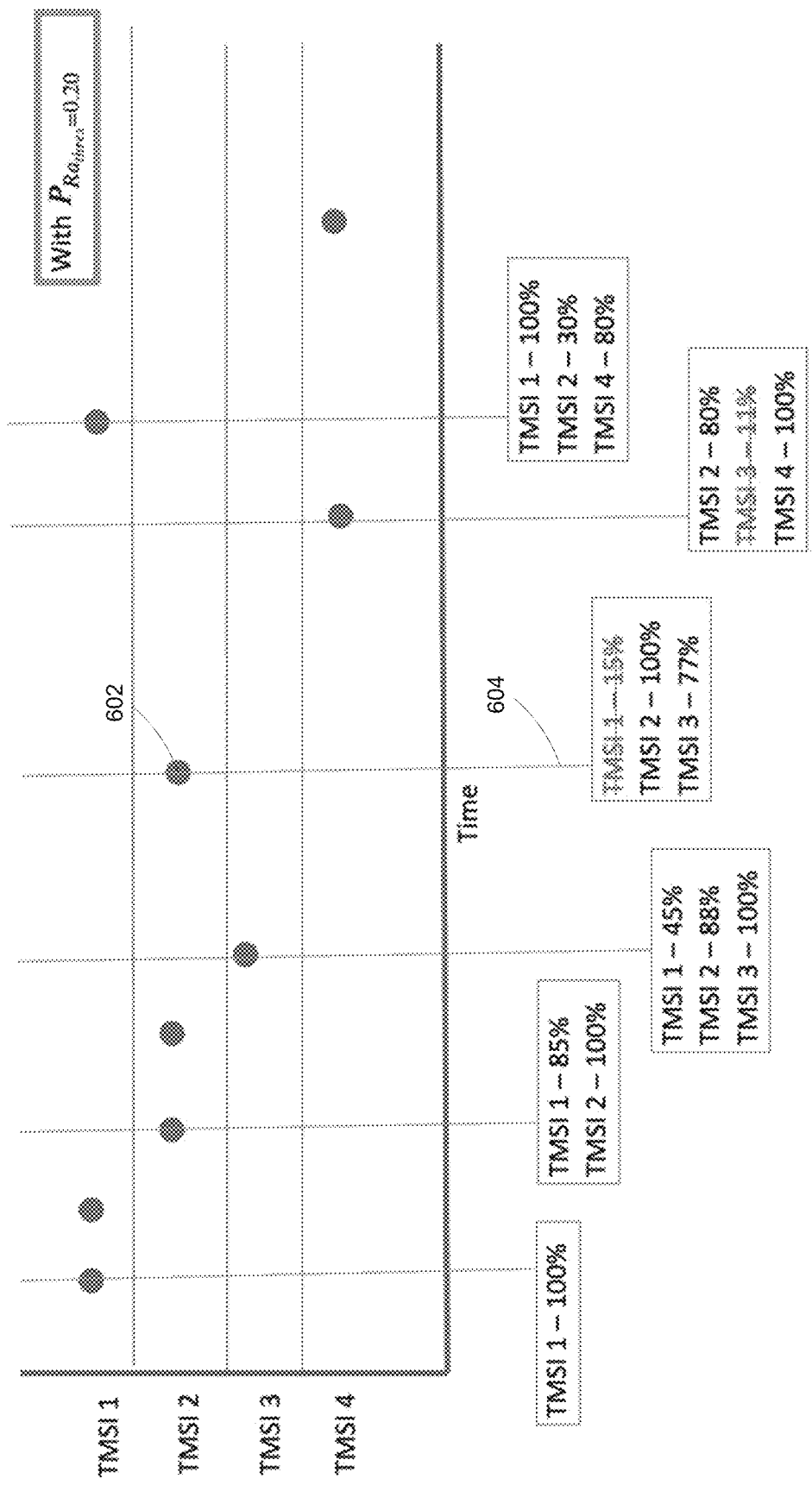
FIG. 6 is a graphic illustrating survival probabilities for various temporary identifiers according to some embodiments of the present technology.

FIG. 6 is a graphic illustrating example survival probabilities for various temporary identifiers according to some embodiments of the present technology. FIG. 6 also represents the streaming list or streaming bag with the latest survival probability for each temporary identifier at any given point in time. The rows of TMSI 1-TMSI 4 are four unique, temporary identifiers captured by the sensor(s). Each dot 602 represents when an access event (e.g., a message) from that temporary identifier was detected. At the point in time an access event is detected, it is know with certainty that the device is present. Then at all subsequent points in the future, the probability that the device is present decays. Each vertical line 604 specifies an exact point in time, at which the possible probability of survival of that unique identifier is determined, as well as any other TMSI in the streaming list, using the above described survival model. FIG. 6 also illustrates an example of applying a theoretical cutoff threshold value to temporary identifiers in the streaming list. Once the probability falls below this threshold it is assumed that the corresponding device is no longer present and should be removed from the streaming list.

Figure 7:
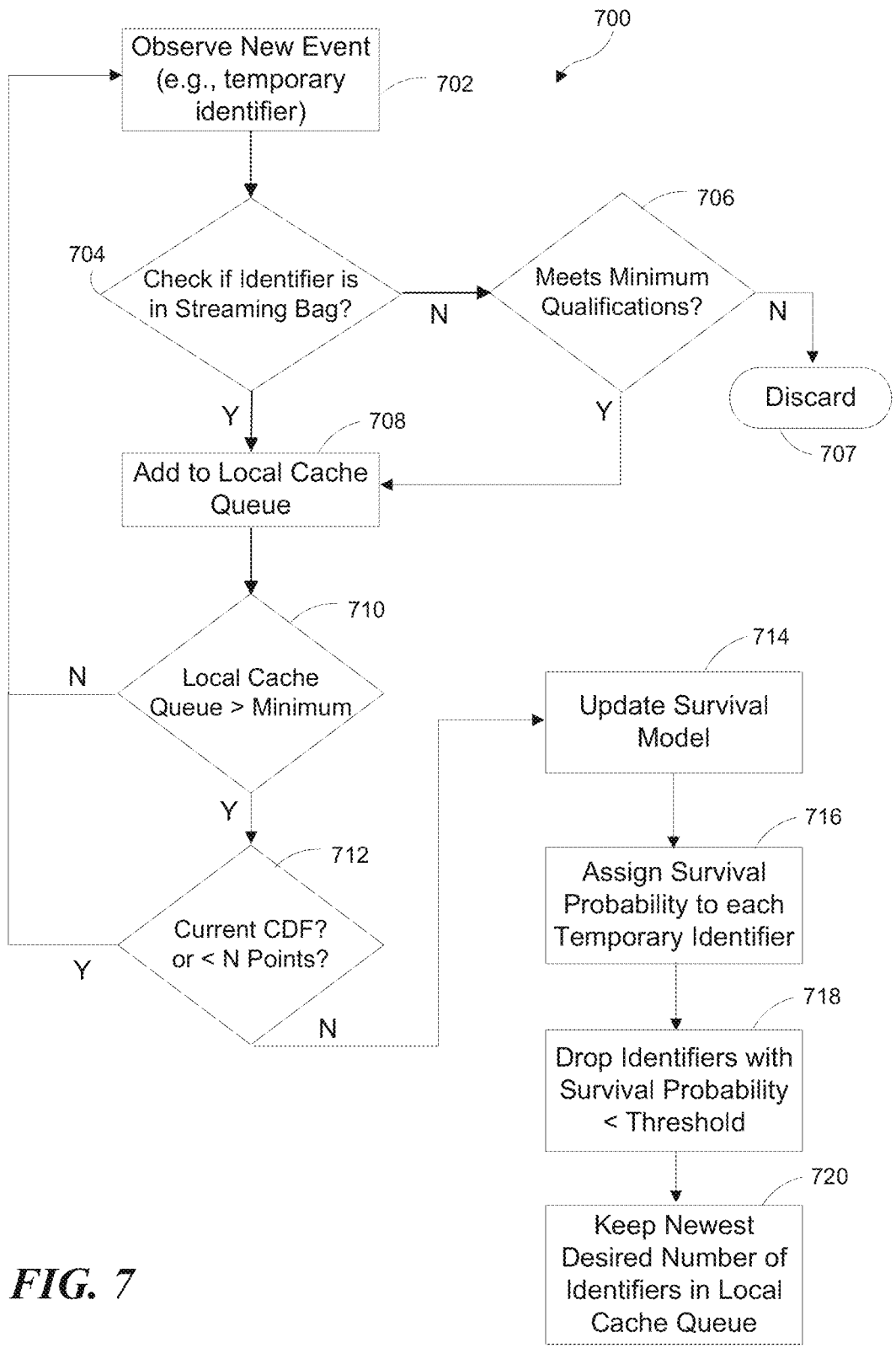
FIG. 7 is a flow diagram showing a method of streaming survival calculations for rotating temporary identifiers according to some embodiments of the present technology.

FIG. 7 is a flow diagram showing a method 700 of streaming survival calculations for rotating temporary identifiers according to some embodiments of the present technology. When a new event (e.g., RACH event) is observed at step 702 the related temporary identifier is checked at step 704 to determine if it has been seen before and is still in the streaming bag. If the temporary identifier is in the streaming bag, the event is added to a local cache queue at step 708. Otherwise, at step 706 the event metadata is evaluated to determine if it meets minimum qualifications, such as minimum signal strength. If the event meets the minimum qualifications it is added to the local cache queue at step 708. Otherwise, the event is discarded at step 707. At step 710, if the size of the local cache queue is less than a minimum threshold the process returns to step 702 to gather additional event data. If the local cache queue is greater than the minimum threshold and there is not a current cumulative distribution function or if the process is on its "every N points" (step 712), then the local cache is transformed into time deltas and the survival model is updated at step 714. Otherwise, the process returns to step 702 to gather additional event data. Once the survival model is updated at step 714, the latest item of each identifier within the local cache queue (e.g., the streaming bag) is processed through the updated cumulative distribution function to get probabilities of survival at step 716. Any identifier that has a probability less than the minimum survival threshold, is removed from the streaming bag at step 718. At step 720, if the local cache queue size is greater than a desired size, only the newest desired number of items is retained in the queue. The local cache queue can be saved to disk as well as in memory, so that when a sensor reboots, it should not have a cold start problem of building up previous knowledge of access or trigger events. The survival model updates can occur potentially multiple times based on what priors are to be involved in the algorithm, such as carrier, time of day, etc. The methodologies described herein provide advantages in that they can be implemented in a low-resource environment (e.g., minimize memory usage, CPU utilization, disk space, and compute time).

Figure 8:
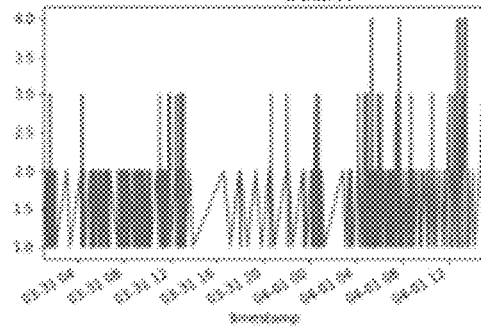
FIG. 8 is a graphic illustrating steps for tuning hyperparameters associated with a streaming bag according to some embodiments of the present technology.
Figure 8:
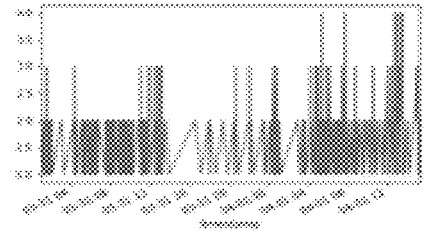
Figure 8:
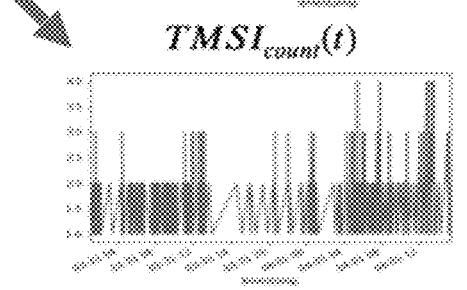

With reference to FIG. 8, in order to tune the main hyperparameters that are associated with the streaming bag, a ground truth set of data (FIG. 9) can be cross-referenced and then run simulations over various combinations of hyperparameters in a high compute environment. These simulations then provide a set of outputs where the number of items in the streaming bag can be tracked at each given time step. This output is then compared to what we can take as relative ground truth to stable environments that have been seen in the past. In these controlled, stable environments, information on when cellular devices are connected to a home network can be collected.

Figure 9:
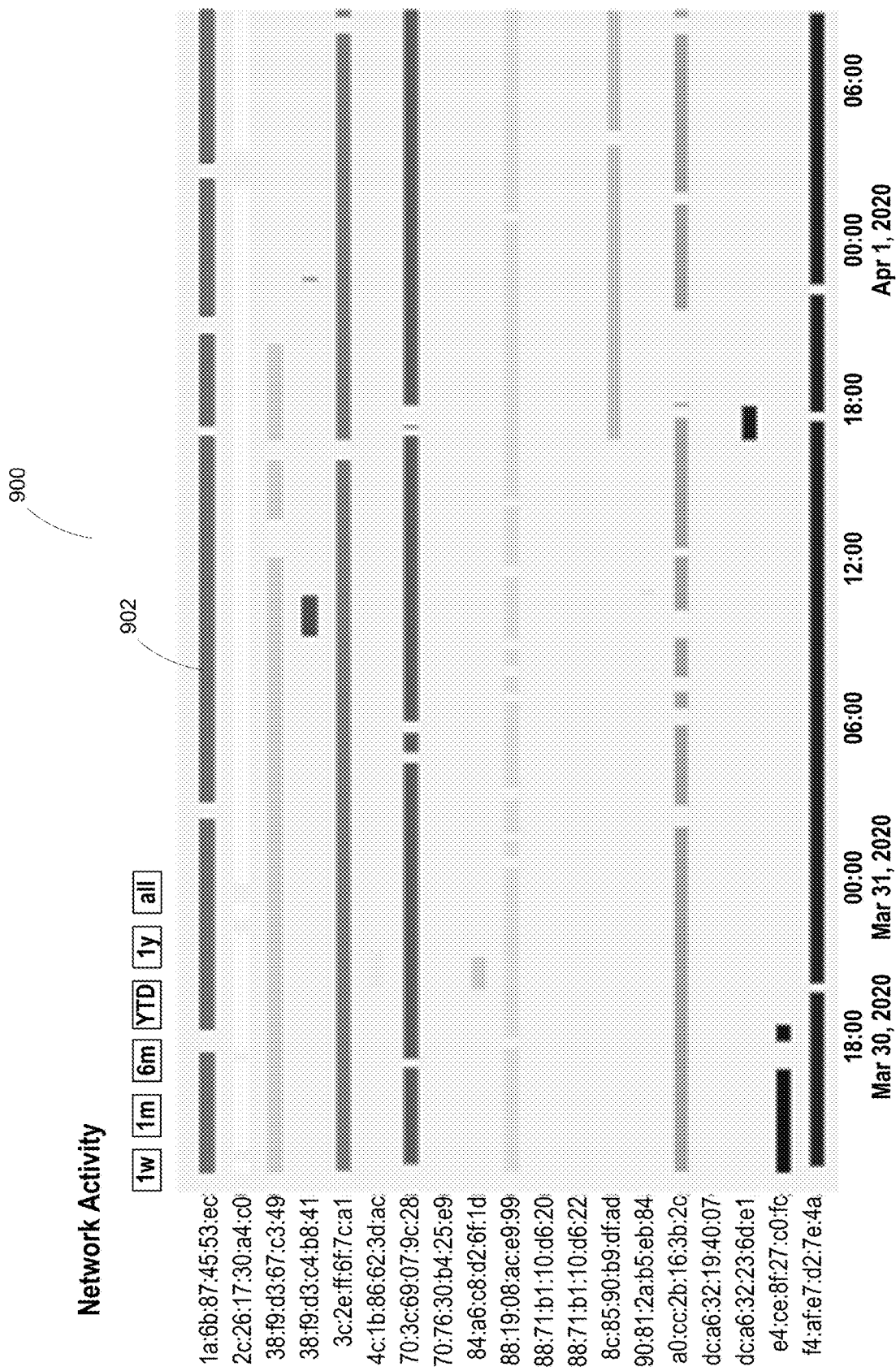
FIG. 9 is a chart illustrating representative network traffic.

FIG. 9 is an example of ground truth (confirmed devices known to be present at a location of interest) Wi-Fi network data 900. Each row 902 of this visualization represents a unique device. Because these MAC addresses are pulled from devices attached to a network there is no MAC address randomization as the phone trusts the router. The duration of the bars represent the times those devices were connected to the network and thus present in the location of interest (e.g., home).

Figure 10A:
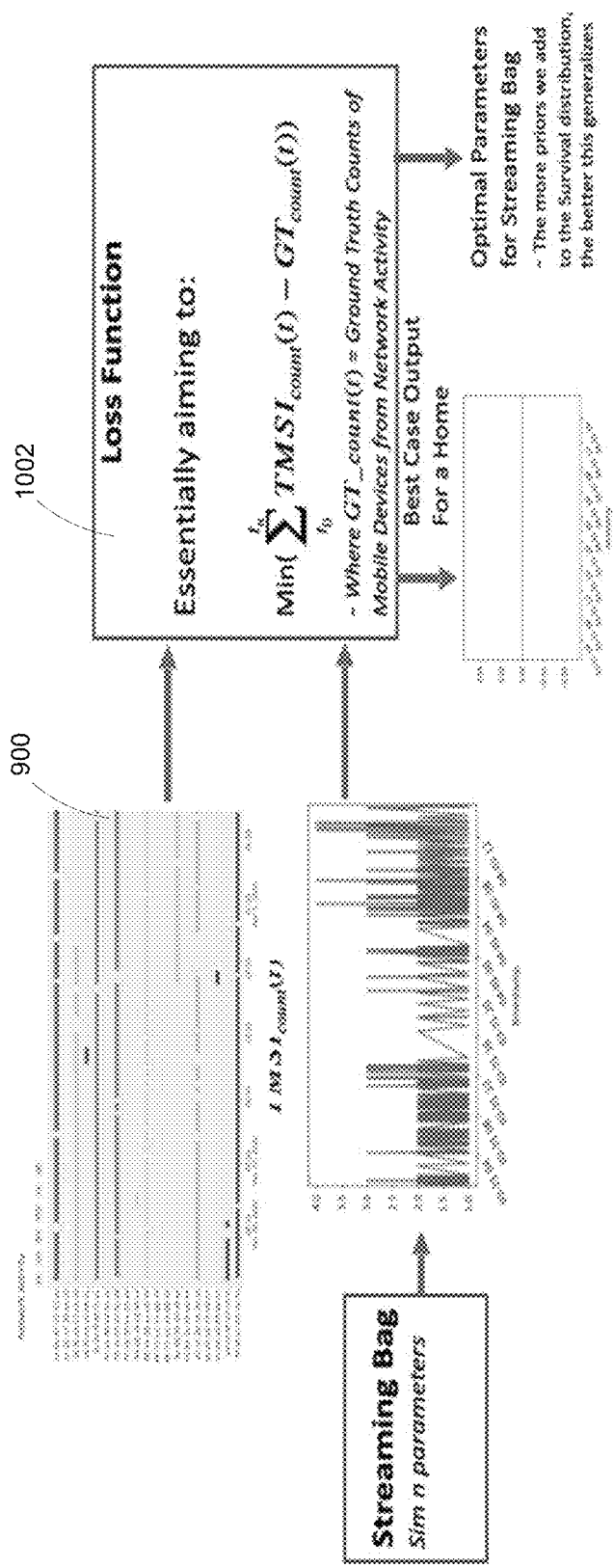
FIG. 10A is a graphic illustrating steps for comparing streaming bag output and comparing against ground truth information for devices known to be on the network according to some embodiments of the present technology.
Figure 10B:
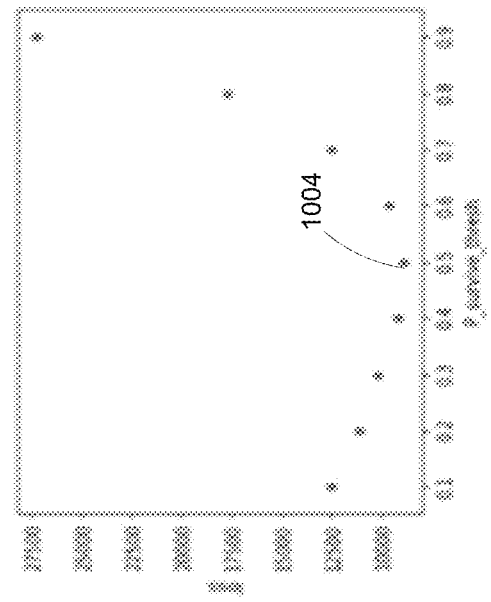
FIG. 10B is a chart illustrating a plot of loss function vs. survival probability threshold according to some embodiments of the present technology.

With reference to FIG. 10A, by taking the output from the simulations that are using cellular data in the example (FIG. 8) and comparing that to what is considered ground truth 900 from the underlying network activity, the streaming bag hyperparameters can be optimally tuned by incorporating an appropriate loss function 1002 between these two sources of data. In some embodiments, the loss function is chosen to minimize the sum of the differences between the count of items in the streaming bag and the ground truth data. For the cellular implementation, the hyperparameter search is done with a Bayesian Optimization and Hyperband (BOHB) search, which as the name suggests combines facets of both a Bayesian and hyperband approach for exploring the hyperparameter search space. An example of visualizing the optimal hyperparameters that minimize the loss can be seen in FIG. 10B. Example plot of the loss function vs. the survival probability threshold from various simulation runs. Each dot represents a different simulation that was run through all of the data. The optimal selection of this particular hyperparameter is a cutoff of 0.5.

Figure 11:
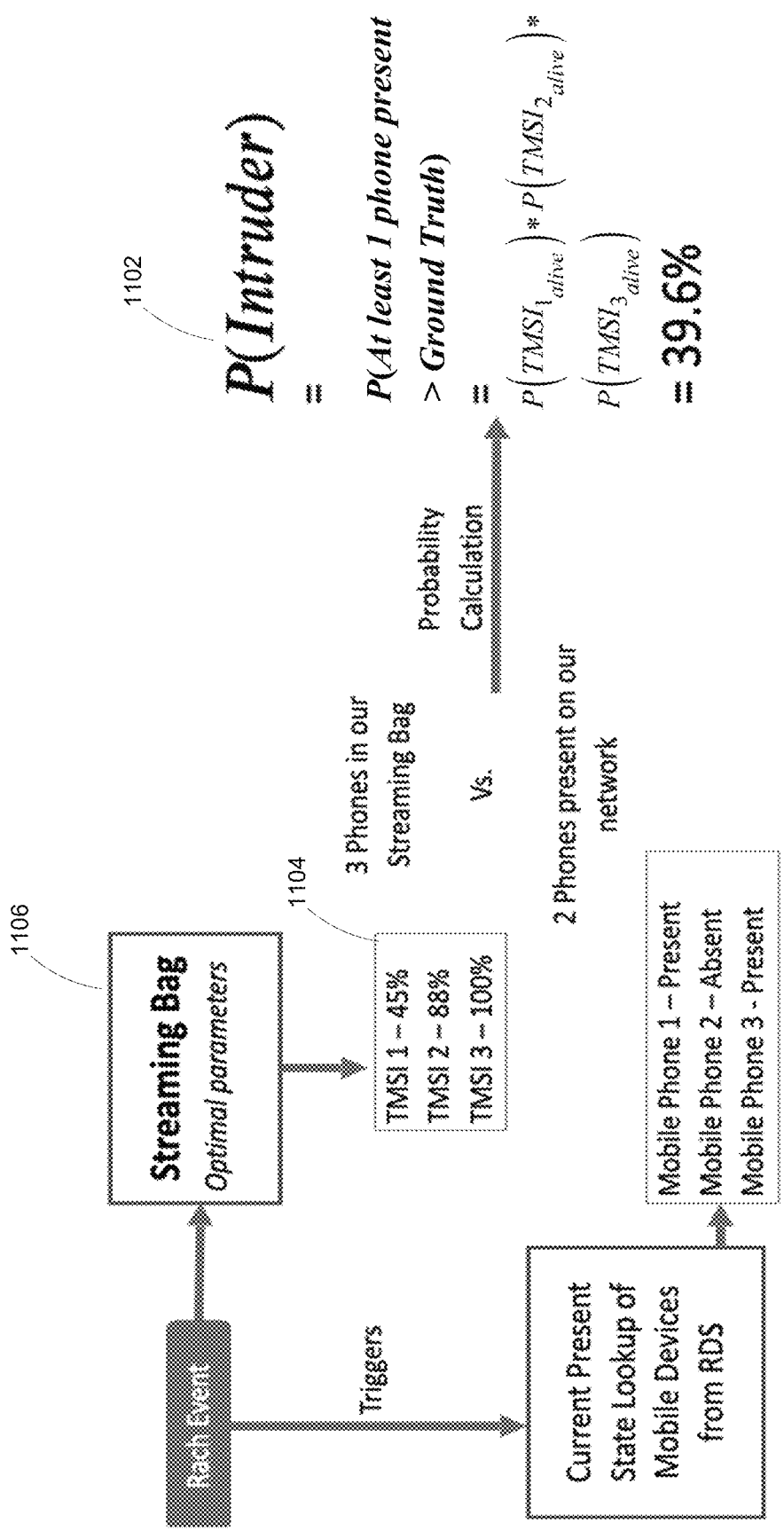
FIG. 11 is a flow diagram illustrating the use of the streaming bag output with the known network data to assess if a house is in an abnormal state.

FIG. 11 is a graphic illustrating the flow of combining the output of the streaming bag methodology with the known network data to then assess if a house is in an abnormal state and calculating the probability that there are more devices present in the location than should be based on network attachments. The disclosed system works in real time and provides the likelihood that each temporary unique identifier previously seen is still present or not at any given point in time. Furthermore, the streaming bag is calibrated to the optimal hyperparameters to best calibrate to the type of data being used in this methodology. The disclosed technology can be applied to detect wireless devices in scenarios using cellular data and to track TMSI rotations. For example, if the streaming bag, after being calibrated for appropriate settings, is suggesting there are currently three devices that are present, but the network data is saying there are two devices that are connected to a trusted Wi-Fi network, the probability that there is in fact a discrepancy between these two sources (e.g., intruder probability 1102) can be calculated, i.e., P(at least 1>n) where n is the number of ground truth devices measured. In some embodiments, calculating the intruder probability 1102 comprises calculating the product of the survival probability values 1104 for each temporary identifier contained in the streaming list 1106. A high probability that there is a discrepancy could lead to the conclusion that the house is in an abnormal state that could range in an actual real life scenario from a burglary to a member of the household having a friend over that does not know the Wi-Fi password.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 12:
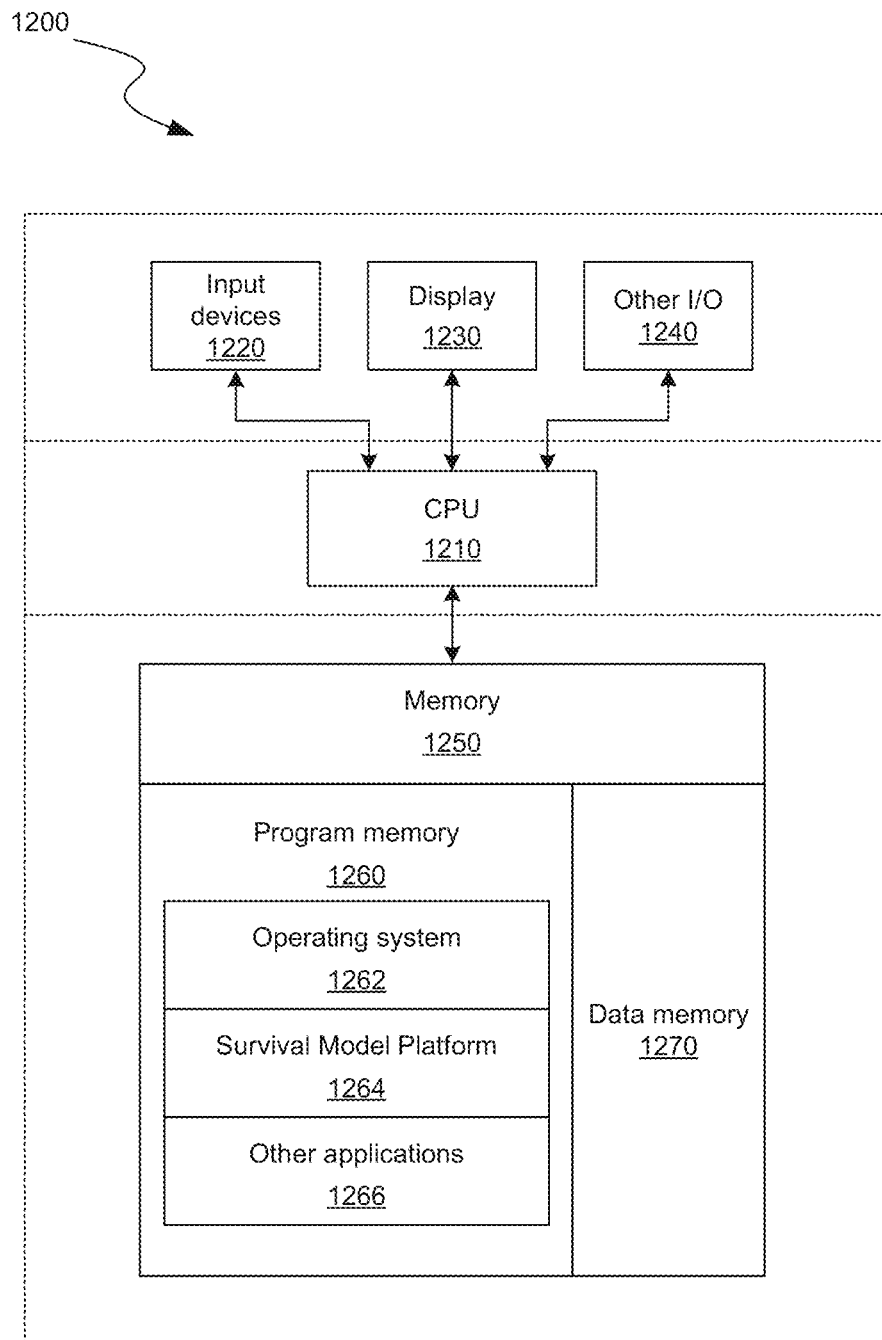
FIG. 12 is a block diagram illustrating an overview of devices on which some implementations can operate.

Several implementations are discussed below in more detail in reference to the figures. FIG. 12 is a block diagram illustrating an overview of devices on which some implementations of the disclosed technology can operate. The devices can comprise hardware components of a device 1200 that determines survival probability of temporary identifiers, for example. Device 1200 can include one or more input devices 1220 that provide input to the CPU (processor) 1210, notifying it of actions. The actions are typically mediated by a hardware controller that interprets the signals received from the input device and communicates the information to the CPU 1210 using a communication protocol. Input devices 1220 include, for example, a mouse, a keyboard, a touchscreen, an infrared sensor, a touchpad, a wearable input device, a camera- or image-based input device, a microphone, or other user input devices.

CPU 1210 can be a single processing unit or multiple processing units in a device or distributed across multiple devices. CPU 1210 can be coupled to other hardware devices, for example, with the use of a bus, such as a PCI bus or SCSI bus. The CPU 1210 can communicate with a hardware controller for devices, such as for a display 1230. Display 1230 can be used to display text and graphics. In some examples, display 1230 provides graphical and textual visual feedback to a user. In some implementations, display 1230 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 1240 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 1200 also includes a communication device capable of communicating wirelessly or wire-based with a network node. The communication device can communicate with another device or a server through a network using, for example, TCP/IP protocols. Device 1200 can utilize the communication device to distribute operations across multiple network devices.

The CPU 1210 can have access to a memory 1250. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 1250 can include program memory 1260 that stores programs and software, such as an operating system 1262, Temporary Identifier Survival Model Platform 1264, and other application programs 1266. Memory 1250 can also include data memory 1270 that can include database information, etc., which can be provided to the program memory 1260 or any element of the device 1200.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 13:
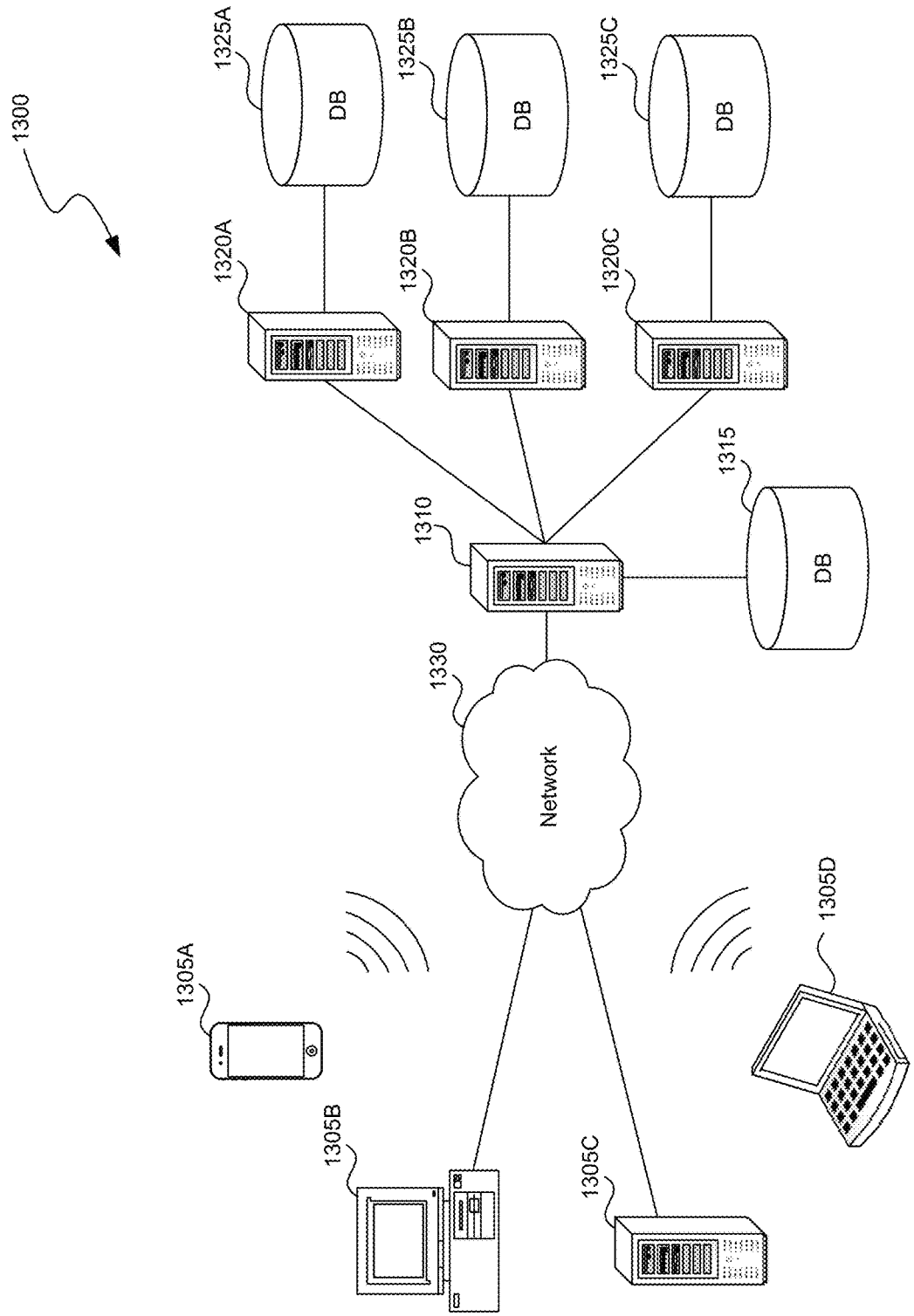
FIG. 13 is a block diagram illustrating an overview of an environment in which some implementations can operate.

FIG. 13 is a block diagram illustrating an overview of an environment 1300 in which some implementations of the disclosed technology can operate. Environment 1300 can include one or more client computing devices 1305A-D, examples of which can include device 1200. Client computing devices 1305 can operate in a networked environment using logical connections through network 1330 to one or more remote computers, such as a server computing device 1310.

In some implementations, server computing device 1310 can be an edge server that receives client requests and coordinates fulfillment of those requests through other servers, such as servers 1320A-C. Server computing devices 1310 and 1320 can comprise computing systems, such as device 1200. Though each server computing device 1310 and 1320 is displayed logically as a single server, server computing devices can each be a distributed computing environment encompassing multiple computing devices located at the same or at geographically disparate physical locations. In some implementations, each server computing device 1320 corresponds to a group of servers.

Client computing devices 1305 and server computing devices 1310 and 1320 can each act as a server or client to other server/client devices. Server 1310 can connect to a database 1315. Servers 1320A-C can each connect to a corresponding database 1325A-C. As discussed above, each server 1320 can correspond to a group of servers, and each of these servers can share a database or can have their own database. Databases 1315 and 1325 can warehouse (e.g., store) information. Though databases 1315 and 1325 are displayed logically as single units, databases 1315 and 1325 can each be a distributed computing environment encompassing multiple computing devices, can be located within their corresponding server, or can be located at the same or at geographically disparate physical locations.

Network 1330 can be a local area network (LAN) or a wide area network (WAN), but can also be other wired or wireless networks. Network 1330 may be the Internet or some other public or private network. Client computing devices 1305 can be connected to network 1330 through a network interface, such as by wired or wireless communication. While the connections between server 1310 and servers 1320 are shown as separate connections, these connections can be any kind of local, wide area, wired, or wireless network, including network 1330 or a separate public or private network.

Figure 14:
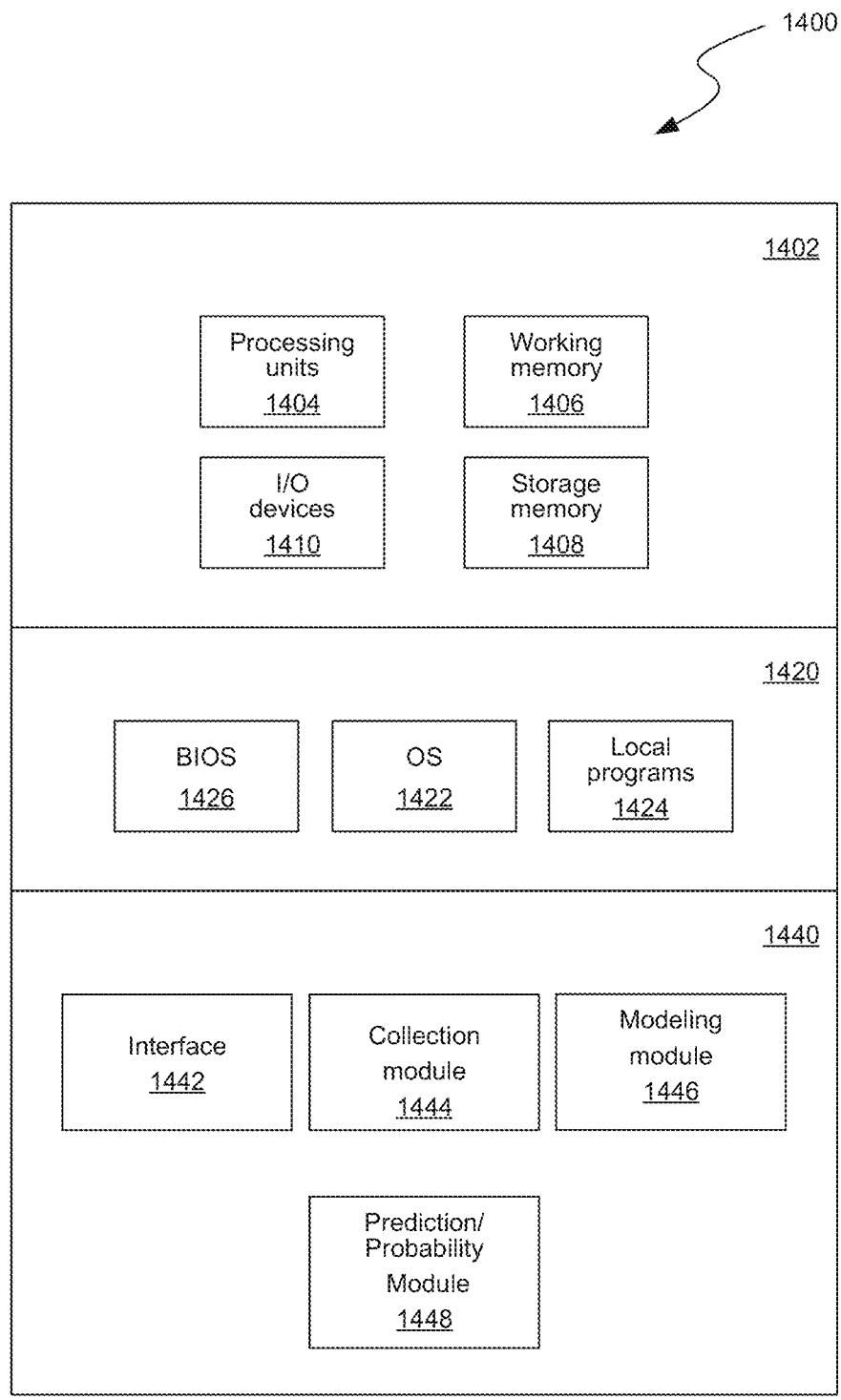
FIG. 14 is a block diagram illustrating components which, in some implementations, can be used in a system employing the disclosed technology.

FIG. 14 is a block diagram illustrating components 1400 which, in some implementations, can be used in a system employing the disclosed technology. The components 1400 include hardware 1402, general software 1420, and specialized components 1440. As discussed above, a system implementing the disclosed technology can use various hardware, including processing units 1404 (e.g., CPUs, GPUs, APUs, etc.), working memory 1406, storage memory 1408, and input and output devices 1410. Components 1400 can be implemented in a client computing device such as client computing devices 1405 or on a server computing device, such as server computing device 1410 or 1420.

General software 1420 can include various applications, including an operating system 1422, local programs 1424, and a basic input output system (BIOS) 1426. Specialized components 1440 can be subcomponents of a general software application 1420, such as local programs 1424. Specialized components 1440 can include an Identifier Collection Module 1444, a Survival Probability Modeling Module 1446, an intruder prediction/probability Module 1448, and components that can be used for transferring data and controlling the specialized components, such as interface 1442. In some implementations, components 1400 can be in a computing system that is distributed across multiple computing devices or can be an interface to a server-based application executing one or more of specialized components 1440.

Those skilled in the art will appreciate that the components illustrated in FIGS. 12-14 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

Although specific embodiments have been shown by way of example in the drawings and are described in detail above, other embodiments are possible. For example, in some embodiments, a wireless device detection system can include one or more processors, one or more memory devices, and one or more sensors configured to receive temporary identifiers transmitted between a base station and a mobile wireless device. The one or more memory devices can have stored thereon instructions that when executed by the one or more processors cause the one or more processors to: build a cumulative distribution function for survival probability based on delta times between a plurality of access events for each of a plurality of temporary identifiers received from the one or more sensors; in response to a new access event, add a corresponding temporary identifier to a streaming list and assign a survival probability value, based on the cumulative distribution function, to a latest access event for each temporary identifier contained in the streaming list; remove temporary identifiers from the streaming list that have a survival probability value less than a threshold value; compare the number of temporary identifiers contained in the streaming list to a number of confirmed devices known to be present at a location of interest; and calculate an intruder probability corresponding to the probability that a device corresponding to each of the temporary identifiers contained in the streaming list is present at the location of interest.

In some embodiments, the base station is a cell station and the temporary identifiers comprise a Temporary Mobile Subscriber Identity (TMSI). In some embodiments, the one or more sensors contains the one or more processors and the one or more memory devices. In some embodiments, building the cumulative distribution function comprises: building a histogram of the delta times between the plurality of access events for each of the plurality of temporary identifiers; fitting a probability distribution function to the histogram; and converting the probability distribution function to the cumulative distribution function for survival probability. In some embodiments, fitting a probability distribution function to the histogram uses an exponential kernel density estimate. In some embodiments, the system further comprises adjusting the threshold value to minimize the difference between the number of temporary identifiers contained in the streaming list and the number of confirmed devices known to be present at the location of interest. In some embodiments, calculating the intruder probability comprises calculating the probability that the streaming list contains at least one temporary identifier more than the number of confirmed devices known to be present at the location of interest.

In another representative embodiment, a wireless detection system can include one or more processors, one or more memory devices, and one or more sensors configured to receive temporary identifiers transmitted between a base station and a mobile wireless device. The one or more memory devices can have stored thereon instructions that when executed by the one or more processors cause the one or more processors to: build a cumulative distribution function for survival probability by: building a histogram of delta times between a plurality of access events for each of a plurality of temporary identifiers received from the one or more sensors; fitting a probability distribution function to the histogram; converting the probability distribution function to a cumulative distribution function for survival probability; assigning a survival probability value, based on the cumulative distribution function, to a latest access event for each temporary identifier contained in a streaming list; remove temporary identifiers from the streaming list that have a survival probability value less than a threshold value; and adjust the threshold value to minimize the difference between the number of temporary identifiers contained in the streaming list and a number of confirmed devices known to be present at a location of interest. In response to a new access event, the processors add a corresponding temporary identifier to the streaming list and assign a survival probability value, based on the cumulative distribution function, to the latest access event for each temporary identifier contained in the streaming list, and remove temporary identifiers from the streaming list that have a survival probability value less than the threshold value.

In some embodiments, fitting a probability distribution function to the histogram uses an exponential kernel density estimate. In some embodiments, the base station is a cell station and the temporary identifiers comprise a Temporary Mobile Subscriber Identity (TMSI). In some embodiments, the one or more sensors contains the one or more processors and the one or more memory devices. In some embodiments, the system further comprises calculating an intruder probability by calculating the probability that the streaming list contains at least one temporary identifier more than the number of confirmed devices known to be present at the location of interest.

In another representative embodiment, a method for detecting wireless devices can include receiving temporary identifiers transmitted between a base station and a mobile wireless device with one or more passive sensors; building a cumulative distribution function for survival probability based on delta times between a plurality of access events for each of a plurality of temporary identifiers received from the one or more sensors; in response to a new access event, adding a corresponding temporary identifier to a streaming list and assigning a survival probability value, based on the cumulative distribution function, to a latest access event for each temporary identifier contained in the streaming list; removing temporary identifiers from the streaming list that have a survival probability value less than a threshold value; comparing the number of temporary identifiers contained in the streaming list to a number of confirmed devices known to be present at a location of interest; and calculating an intruder probability corresponding to the probability that a device corresponding to each of the temporary identifiers contained in the streaming list is present at the location of interest.

In some embodiments, the base station is a cell station and the temporary identifiers comprise a Temporary Mobile Subscriber Identity (TMSI). In some embodiments, building the cumulative distribution function comprises: building a histogram of the delta times between the plurality of access events for each of the plurality of temporary identifiers; fitting a probability distribution function to the histogram; and converting the probability distribution function to the cumulative distribution function for survival probability. In some embodiments, fitting a probability distribution function to the histogram uses an exponential kernel density estimate. In some embodiments, the method further comprises adjusting the threshold value to minimize the difference between the number of temporary identifiers contained in the streaming list and the number of confirmed devices known to be present at the location of interest. In some embodiments, calculating the intruder probability comprises calculating the probability that the streaming list contains at least one temporary identifier more than the number of confirmed devices known to be present at the location of interest.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A computer-implemented method performed by a security monitoring device for tracking people at a location, the method comprising:
   receiving, by at least one hardware processor of the security monitoring device, streaming data from a streaming data source at the location,
   wherein the streaming data is associated with observed events;
   discarding at least one event of the observed events based on evaluating event metadata;
   identifying a presence of a device at the location based on the streaming data;
   building a probability distribution function based on access events for temporary identifiers received from devices at the location;
   determining that the device is an unknown device based on network data associated with known devices;
   determining, based on the streaming data and the network data, that the unknown device corresponds to a presence of an unwelcome entity at the location; and
   in response to determining that the unknown device corresponds to the presence of the unwelcome entity:
   providing, to a user, visual feedback indicating the presence of the unwelcome entity.

2. The computer-implemented method of claim 1, comprising:
   determining an intruder probability corresponding to the presence of the unwelcome entity.

3. The computer-implemented method of claim 1, comprising:
   determining a probability that a streaming list is associated with more than a number of confirmed devices known to be present at the location.

4. The computer-implemented method of claim 1, wherein the device associated with the streaming data is a wireless device, and wherein the security monitoring device is a base station.

5. The computer-implemented method of claim 1, wherein the streaming data source is a camera or an image-based input device.

6. The computer-implemented method of claim 1, wherein the visual feedback comprises text and/or graphics.

7. The computer-implemented method of claim 1, wherein the visual feedback is provided using an electronic display.

8. A security monitoring device, comprising:
   one or more processors; and
   one or more non-transitory memory devices having stored thereon instructions that when executed by the one or more processors cause the one or more processors to:
      receive streaming data from a streaming data source at a location,
         wherein the streaming data is associated with observed events;
      discard at least one event of the observed events based on evaluating event metadata;
      identify a presence of a device at the location based on the streaming data;
      build a probability distribution function based on access events for temporary identifiers received from devices at the location;
      determine that the device is an unknown device based on network data associated with known devices;
      determine, based on the streaming data and the network data, that the unknown device corresponds to a presence of an unwelcome entity at the location; and
      in response to determining that the unknown device corresponds to the presence of the unwelcome entity:
         provide visual feedback indicating the presence of the unwelcome entity.

9. The security monitoring device of claim 8, wherein the instructions cause the one or more processors to:
   determine an intruder probability corresponding to the presence of the unwelcome entity.

10. The security monitoring device of claim 8, wherein the instructions cause the one or more processors to:
    determine a probability that a streaming list is associated with more than a number of confirmed devices known to be present at the location.

11. The security monitoring device of claim 8, wherein the device associated with the streaming data is a wireless device, and wherein the security monitoring device is a base station.

12. The security monitoring device of claim 8, wherein the streaming data source is a camera or an image-based input device.

13. The security monitoring device of claim 8, wherein the visual feedback comprises text and/or graphics.

14. The security monitoring device of claim 8, wherein the visual feedback is provided using an electronic display.

15. A non-transitory memory device having stored thereon instructions that when executed by one or more processors cause the one or more processors to:
    receive streaming data from a streaming data source at a location,
       wherein the streaming data is associated with observed events;
    discard at least one event of the observed events based on evaluating event metadata;
    identify a presence of a device at the location based on the streaming data;
    build a probability distribution function based on access events for temporary identifiers received from devices at the location;
    determine that the device is an unknown device based on network data associated with known devices;
    determine, based on the streaming data and the network data, that the unknown device corresponds to a presence of an unwelcome entity at the location; and
    in response to determining that the unknown device corresponds to the presence of the unwelcome entity:
       provide visual feedback indicating the presence of the unwelcome entity.

16. The non-transitory memory device of claim 15, wherein the instructions cause the one or more processors to:
    determine an intruder probability corresponding to the presence of the unwelcome entity.

17. The non-transitory memory device of claim 15, wherein the instructions cause the one or more processors to:
    determine a probability that a streaming list is associated with more than a number of confirmed devices known to be present at the location.

18. The non-transitory memory device of claim 15, wherein the device associated with the streaming data is a wireless device.

19. The non-transitory memory device of claim 15, wherein the streaming data source is a camera or an image-based input device.

20. The non-transitory memory device of claim 15, wherein the visual feedback comprises text and/or graphics.

* * * * *